United States Patent [19]

Kanengieter et al.

[11] 3,965,660
[45] June 29, 1976

[54] STACK FORMING APPARATUS

[75] Inventors: Glenn G. Kanengieter, Blooming Prairie; Gerald E. Barry, Owatonna, both of Minn.

[73] Assignee: Owatonna Manufacturing Company, Inc., Owatonna, Minn.

[22] Filed: Nov. 27, 1974

[21] Appl. No.: 527,703

[52] U.S. Cl. .................................. 56/344; 56/346; 100/218; 100/233; 214/518
[51] Int. Cl.² ........................................ A01D 85/00
[58] Field of Search ............ 56/344, 346, 347, 350, 56/351, 364; 214/518 X, 519, 520, 521, 522; 100/218 C, 233 R

[56] References Cited
UNITED STATES PATENTS

| | | | |
|---|---|---|---|
| 3,584,448 | 6/1971 | Marbinmaas | 56/346 X |
| 3,771,673 | 11/1973 | Moeller | 56/346 X |
| 3,842,732 | 10/1974 | Anderson | 56/344 X |
| 3,871,163 | 3/1975 | Kanengieter | 56/344 |

*Primary Examiner*—Louis G. Mancene
*Assistant Examiner*—J. N. Eskovitz
*Attorney, Agent, or Firm*—Schroeder Siegfried Ryan & Vidas

[57] ABSTRACT

A stack forming apparatus comprising a chassis with a stack forming container thereon and a crop pick up means for directing harvested crop into the container. The stack forming container includes a pivoted roof having sloped forward and rearward sections and actuators for pivoting the same through varying arcs to provide a resultant stack sloped at the front and rear edges thereof. The container contains a pivoted floor and a push-out fork mechanism which moves the stack within the container causing pivoting of the floor. The pivoted rear door at the top edge of the container will be opened either by tilting of the container floor or operating of a latch means to engage a door pivoting linkages with raising of the roof to facilitate discharge of the stack after formation.

15 Claims, 7 Drawing Figures

STACK FORMING APPARATUS

Our invention relates to stack forming apparatus and more particularly to an improved stack forming apparatus and employing simplified compacting and discharge means.

Stack formers for harvested crop which incorporate the pick up means, means for compacting the same and means for discharging a formed stack are known and take a variety of forms. Generally, the larger the stack, the greater the sophistication in terms of compacting structure, distribution of the loose crop within the container for uniformity in stack construction, shaping of the stack through shaping of the compacting means, and structure for unloading the stack without altering the shape of the same. The latter normally includes tilting of the container and means for driving the stack out of the container together with a cooperation or operation of the rear door opening structure. Such structures become exceedingly complex and costly, require greater amounts of power to operate the same and cannot readily be operated by a single operator from a tractor in a harvesting operation. The co-pending application of Glenn G. Kanengieter and Daniel E. Peterson, Ser. No. 409,906, filed Oct. 19, 1973, and entitled STACK FORMING AND COMPACTING STRUCTURE discloses one simplified arrangement in which the movable roof forms the compacting structure for shaping the stack and providing for uniformity of distribution of material therein. This particular pivoted roof type compacting structure further requires large amounts of power and for tilting the container in the unloading operation together with a more complex unloading structure and an arrangement for opening of doors in the discharge of the stack.

The present invention is an improvement over the same which utilizes the basic principle of a pivoted roof in a compacting structure, but simplifies the arrangement of parts of the same for more uniformity and stack density and shaping, together with a simplified discharge structure which includes pivoting of the floor of the container with a simplified push-type discharge mechanism and automatic rear door opening as the stack is discharged.

Therefore, it is the object of the present invention to provide an improved stack forming apparatus.

Another object of this invention is to provide in an apparatus of this type a simplified arrangement of parts to utilize a push type unloading operation which coacts with the tilting platform supporting the stack to simplify the discharge of the same.

A further object of this invention is to provide a simplified structure for stack removal and door opening which can be automatically affected by operation of the stack removal actuators.

A still further object of this invention is to provide an improved stack forming apparatus including a simplified compacting structure for uniformity of compaction in a stack and a shaping of the same.

These and other objects of this invention will become apparent from reading of the attached description together with the drawings wherein:

FIG. 4 is a schematic view showing the stack forming apparatus in a stack removal mode of operation;

Our improved stack forming apparatus is shown generally in the drawings at 10. It incorporates a chassis 20 having a pair of wheels or wheel support 22 intermediate the extent of the same and a hitch coupling 24 the front of the same adapted to couple the apparatus to a towing vehicle, such as a tractor. The tractor will also supply rotative power to its power take-off to a drive mechanism, indicated at 26, on the chassis and a hydraulic source of power through an auxiliary power supply on a tractor vehicle to piping 28 on the chassis. The chassis or frame mounts a harvester type pick up 30 near the hitch extremity of the same, the harvester type pick up having flail type pick up mechanism 34 driven from the power take-off with a suitable blower (not shown) for moving harvested crop, such as hay, through a chute 38 upwardly into a stack forming container 40. Suitable hydraulic actuators 41 raise and lower the pick up mechanism for transport and operation purposes, respectively. The stack forming container 40 has solid sides 42 and a generally open front frame 44 which is open at the top extremity adjacent at the end of the chute 38 to receive the harvested crop picked up by the pick up mechanism. At the rear of the container is a pivoted door 48 which is pivoted across the rear of the container through a tubular pivot mechanism 50 positioned on the upper end of the same, such that the door is hinged at the top of the container and pivots with respect thereto.

Figures 1, 5:
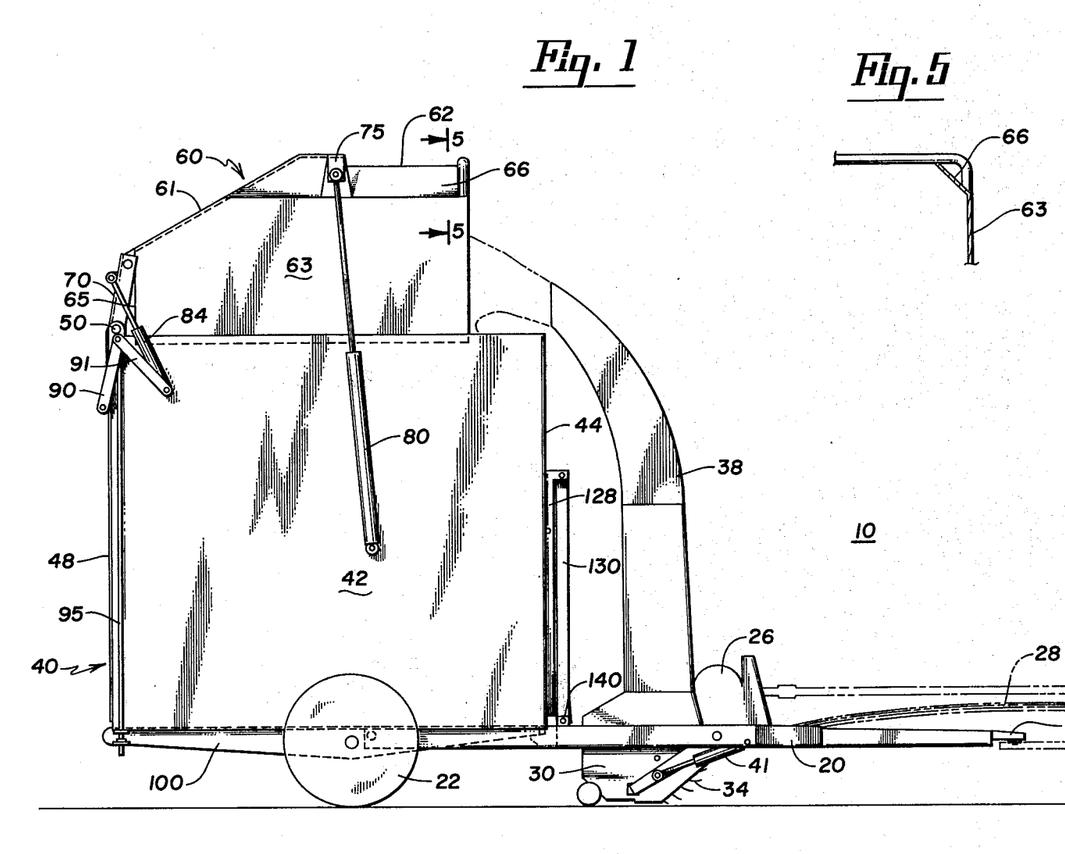
FIG. 1 is a side elevation view of the improved stack forming apparatus with a compacting roof in a raised or loading position.
FIG. 5 is a sectional view of a portion of FIG. 4 taken along the lines 5—5 therein and with parts broken away.
Figure 2:
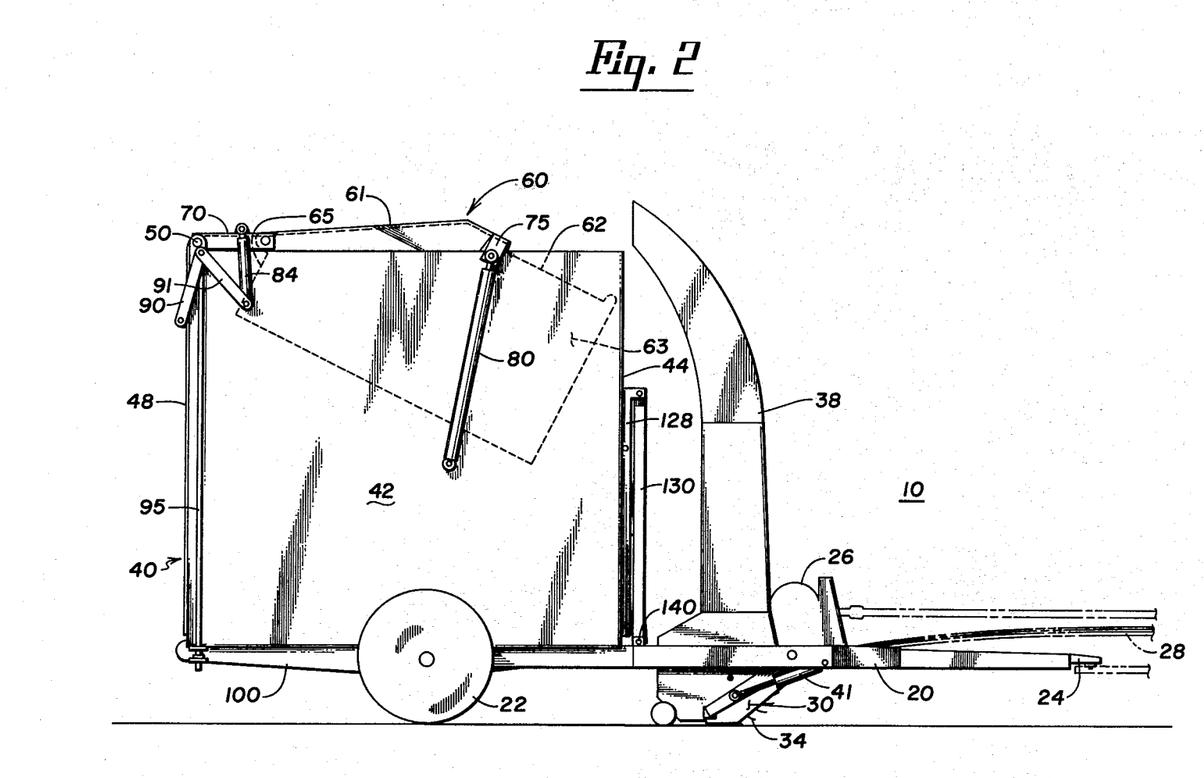
FIG. 2 is a side elevation view of the stack forming apparatus of FIG. 1 with a compacting roof in a lowered or compacting position.
Figure 3:
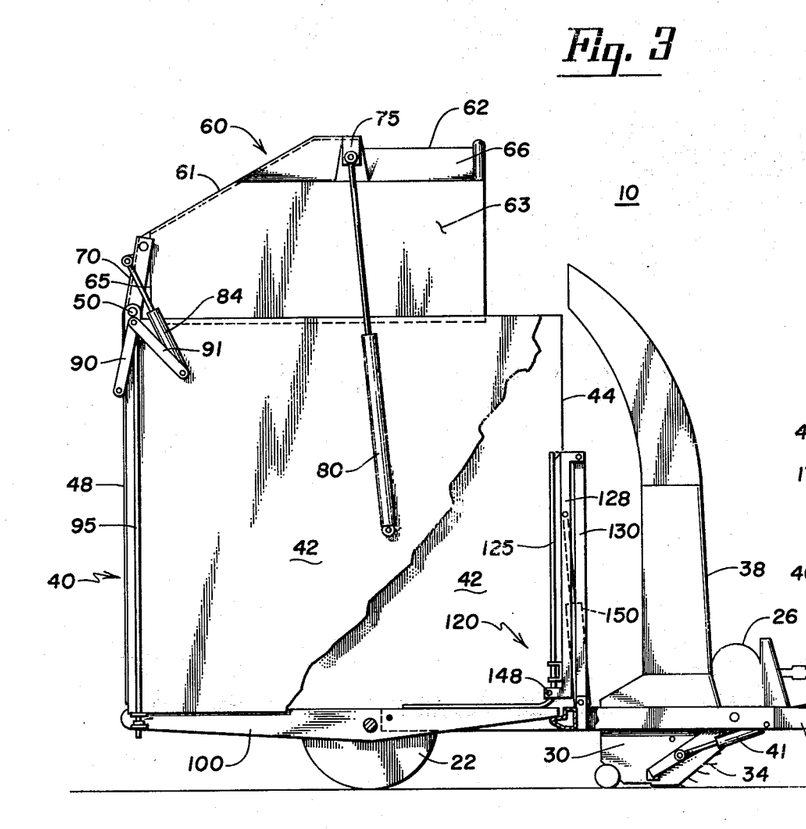
FIG. 3 is a side elevation view with parts in section to show the unloading apparatus.

The container 40 includes a pivotally mounted roof member 60. The roof has a straight section 61 extending from the rear edge of the same toward the front with a downwardly slanted front edge section 62. The roof 60 has side members 63 which extend from the rear of the roof with an increasing width or depth toward the open front end of the roof, common to the sloped portion 62. It incorporates a rear side 65 of uniform width and internally the roof has inwardly sloped side portions 66 as best seen in FIG. 5 which extend from the side members 63 to the roof sections 61, 62, to reinforce the roof at a connecting actuator thrust bar 75. The roof is mounted on the stack forming container by means of a pair of pivot arms 70 at the rear edge of the roof which are pivotally connected thereto through a rod member 75 and to the pivot structure 50 which mounts the pivoted rear door of the container. Thus, the rear of the roof will pivot through an arc defined by the length of the pivot arms 70. The connecting thrust bar 75 is positioned across the slanted portion 62 of the roof and provides the pivot points for a pair of actuators 80 which are journaled at one extremity (shaft extremity) on the thrust bar with the cylinder extremities being pivotally mounted to the sides 42 of the container intermediate the extent thereof. A second pair of actuators 84, or a single actuator on one side of the container, are connected between the ends of the links or pivot arms 70 and the sides or side 42 of the container near the rear edge thereof to affect pivotal motion of the rear of the container. With all of the actuators extended, the rear side 65 and the sides 63 of the roof align with the top of the container and such that the open front of the roof is exposed above the upper end of the chute 38 from which material is discharged. The arcs of motion of the pivoted arm 70 are of significantly shorter radius than the arcs moved by the actuators 84 or the shaft extremities of the same as the front portion of the roof is pivoted into the container. Hence, the sloped sides of the roof 63 which are largest at their forward extremity extend further into the container than the rear side and the overall shape of the roof in the maximum compacting position or retracted position of the actuators is such as to provide a slope to the stack at both the front and rear as well as the sides of the stack to provide a sloped crown as the compacting process takes place and the finished stack is obtained.

Figures 4, 7:
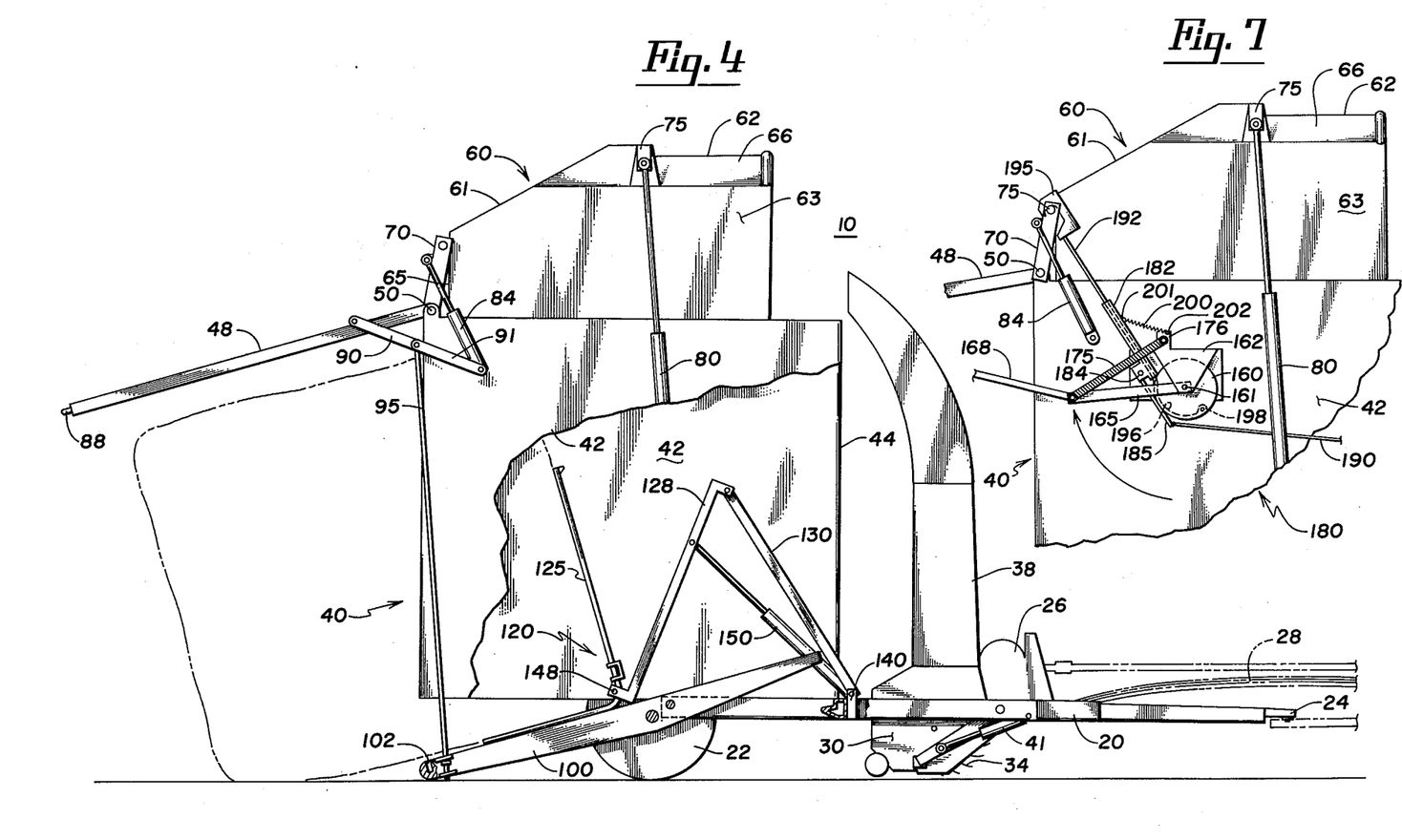

The pivoted rear door 48 has tooth members 88, see FIG. 4, extending along the bottom edge thereof and the door is actuated by a pair of link members 90, 91, which are pivotally connected at one extremity respectively to the outside of the pivoted door and to the sides of the container with the opposite extremities of the links being pivotally connected together and upwardly projecting along the side walls of the container. A rod member 95 is connected to the pivotal link members 90, 91, at the pivot point common thereto and vertical movement of the rod, as will be hereinafter noted, expands the links to pivot the door 48 to an open position or as the rod is elevated, brings the door to a closed position against the rear sides of the container. The rod or pipe 95 is positioned on each side of the container and connects to the floor or base 100 of the container. The latter is pivotally mounted on the chassis in vertical alignment with the axle of the wheels such that the floor will pivot over the wheels for the purpose of discharging the stack. The rod 95 which is connected to the floor 100 will cause downwardly movement of the pivotal link members 90, 91, and spreading the same to open the door 48 as the floor 100 pivots downwardly. This will separate the tooth members 88 on the bottom edge of the door from apertures 102 in the rear edge of the floor, allowing release of a latch formed thereby and permitting the floor to contact the ground such that a stack within the container will slide along the floor with the door being pivoted from the top of the container to allow discharge of the same.

At the front end of the container and positioned within the same is a fork unloader 120 which includes an "L" shaped fork member 125 having a width extending across the width of the container and with the two portions of the fork member extending along the floor of the container and the other extending upwardly and normal thereto substantially half of the height of the container. The pair of pivot arms 128, are connected respectively to the upstanding portion of the "L" shaped fork structure and to either side of the center thereof and a similar pair of pivot arms 130 are pivotally mounted at one extremity to flanges 140 on the chassis of the container forward of the front side thereof with the free ends of the pivot arms 130 being connected to the free ends of the pivot arms 128. Suitable actuators of the hydraulic type, indicated generally at 150, are connected to the flanges 140 on the frame at one extremity and to the pivot arms 128 at their shaft extremities for the purpose of expanding the linkages formed by the parallel arms 128, 130, and moving the fork on two sides along the floor 100 of the container with the portion sliding along the floor and the normal portion thereto riding against the forward edge of the stack to discharge the same.

As the stack is moved from a central location within the container with its mass equally distributed over the axle and towards the rear of the container, the floor begins to pivot and the pivotal connected between the extremities of the arms 128 and the "L" shaped fork structure 125 allows the fork to follow the floor as the actuators 150 are extended to cause pivotal movement of the floor to a point where it engages the ground at wheel level to enable the stack to be discharged to the ground. The pivot arms 128 include transversely extending flange portions 148 at the extremities of the same where they connect respectively to the upstanding portions or side of the "L" shaped fork member and to the ends of the pivot arms 130. With this arrangement of parts, and with the actuators 150 fully retracted, the pivot arms 128 and 130 are disposed in the spaced parallel relationship to one another and vertically along the front wall of the container with the "L" shaped fork portion having the tine portion positioned parallel with the floor and the upstanding portions vertical thereto along the front wall of the container or forming a portion of the front wall of the container. As the actuators 150 are extended, the arms 130 and 128 pivot with respect to one another at their pivotal connections on the frame and to the "L" shaped fork members to permit the "L" shaped fork member to ride along the floor and move a compacted crop or stack out of the container and to pivot with the floor in the same relationship as the load moves over center and causes pivoting the floor. With pivotal movement of the floor, the teeth 88 which normally rest in the apertures 102 in the rear edge of the floor 100 separates therefrom permitting the rod member to pull the links 90, 91, at their pivotal interconnected point downwardly opening the door 48 of the container to facilitate discharge of the stack therefrom. The discharge of the stack is accomplished after the actuators are extended and the fork member moving behind the wheel level of the chassis by forward movement of the chassis due to the towing vehicle to allow the stack to be deposited on the ground. Once the stack is deposited on the ground, retraction of the actuators 150 will cause the fork member to slide backwardly along the floor pivoting the floor upwardly and causing the door to move to a closed position. A lost-motion connection between the rod 95 and the floor permits the floor to tilt to a point where the rear door is unlatched or released before the rod 95 effects downward movement of the linkages and opening the door. Similarly, the force of gravity on the door will cause the same to reach a raised or closed position before the floor section is brought back to a horizontal position in line with the chassis frame to effect locking of the teeth therein.

In the operation of the stack forming apparatus, a single operator driving a tractor may engage the power take-off of the tractor and with the roof actuators elevated cause the pick up mechanism to drive blowing the harvested crop, such as hay, picked up by the flail type pick up and other suitable pick up means through the chute and into the interior of the container. It will be understood that the pick up means may include a severing means if desired. In the normal loading operation, the discharge fork member will be retracted against the front end of the container, the floor of the container will be positioned in a level position and held therein by the "L" shaped fork member and the linkages connected thereto with the rear door of the container closed. As material is moved into the container, and when it reaches a suitable height therein, the actuators 80, and 84 are simultaneously energized to cause pivotal movement of the roof. These actuators may be connected with parallel hydraulic lines so that each will receive hydraulic power from the same lines. A suitable control will be mounted on the tractor and the hydraulic fluid will be directed through the flexible hose lines 28 positioned on the front of the chassis to the actuators. In the raised position of the roof, the rear and side portions thereof form an enclosure with the sides and the rear of the container and leaving an opening at the front thereof adjacent the open end of the discharge chute through which the material will be directed. This will prevent any material from escaping from the container in the loading direction. As the actuators 80 and 85 are energized to a retracted position, the rear of the container pivots through a small arc, indicated by the length of the pivot arms 70 which carry the same, while the actuators 80 on the sides of the container and connected toward the front of the roof will pivot through a larger arc causing the front portion of the roof to move through a larger arc and into the walls of the container. The roof will form a center section with sloped rearwardly extending and forwardly extending sides since the roof portion 62 is sloped downwardly from the general extent of the roof portion 61. This will provide a resulting stack which is sloped along the side edges and its front and back as the hay or crop is compacted therein. The flow pattern of the material following the contoured roof will distribute the hay or crop therein and the pivotal forward movement of the roof in the compacting direction will uniformly distribute the hay to provide for uniform distribution between the front and back of the container. As the levels of the hay or crop are built up in the container, the roof will be selectively pivoted to the closed position or compacting position until a complete stack is formed therein. At this point, the stack is transported to a place of unloading at which point the roof actuators are raised to allow clearance of the stack within the container and the actuators 150 on the unloading fork member are energized causing pivotal movement of the floor 100 and opening of the rear door. This movement combined with forward movement of the tractor or towing vehicle will allow the stack to be deposited on the ground in a compacted manner and with the stack formed with a sloped crown at the top of the same to prevent collection of moisture therein as it sits exposed. After the stack has been unloaded, the actuators 150 are retracted causing the floor to return to a level position and the door to a closed position and to be latched with the floor. Thereafter, the process of picking up and/or harvesting crop and picking the same up directing it into the container together with the periodic compaction of the material within the container will be continued for the fabrication of the additional stacks.

Figure 6:
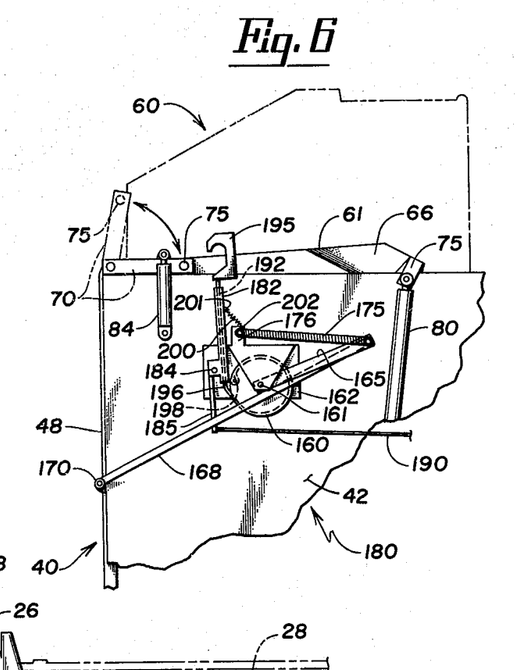
FIG. 6 is a side elevation view of an alternate embodiment of the stack forming apparatus with parts away and showing a modified structure of a rear door opener in an inoperative position; and, FIG. 7 is a side elevation view of the embodiment of FIG. 6 with parts broken away and showing an operative position of the door opener.

In the embodiment shown in FIGS. 6 and 7, the stack forming apparatus incorporates the same basic structure of the chassis with the crop pick up harvester 30 positioned thereon. The stack forming container 40 includes the pivotally mounted roof member 60 in the same shape with the sloped sides and rear side and the actuators 80 mounting the forward end of the same. The rear side of the roof is pivoted on the arms or links 70 and a single or a pair of actuators 84 are connected thereto and to the sides of the container for pivoting the rear of the roof. The rear door 48 is pivoted on the container, as at 50, and the container includes the pivoted floor 100 with the stack push out fork structure 125 engaging the formed stack to discharge the same. In this embodiment, the pivoted rear door 48 is now opened through movement of the roof as engaged with a special latch mechanism, to be hereinafter defined, rather than through the pivoting of the floor 100 in the previous embodiment. As in the previous embodiment the rear sides 65 of the roof 60 is pivoted on the links 70 through the rod member 75 with extension and retraction of the actuator 84 which may be either a single actuator positioned on one side of the container or a pair of actuators positioned respectively on each side of the container and connected to the links 70 and energized for simultaneous operation. In this alternate embodiment, a drum or cable sheave 160 is positioned on one side of the container and journaled thereon through a shaft 161 carried by a mounting bracket 162 fixed to the side of the container. The sheave has a first arm 165 connected thereto at the axis of rotation and a second arm 168 pivotally connected to the opposite extremity of arm 165 and extending back to the rear door 48 to be pivotally connected thereon, as at 170. Clockwise rotation of the sheave 160 as seen in FIGS. 6 and 7, will pivot the arms 165, 168, in a direction to force the rear door to pivot upwardly on its pivot 50 to open the same. The bracket 162 mounts one end of a torsion spring 175, as at 176, with the opposite extremity being connected to the pivot between the arms 165, and 168. This will bias the arms and sheave 160 in a counter clockwise direction to urge the rear door toward a closed position. Also positioned on the side of the container is a latch means, indicated generally at 180, in the form of a pivoted tube assembly and including an outer tube 182 which is pivotally mounted on a bracket and pin 184 connected to the side of the container with an arm extension 185 extending in the opposite direction therefrom and carrying a pull rope or cable 190 on the free end of the same. Positioned within the outer tube 182 is an inner tube 192 having a hook-like member 195 positioned at one extremity of the same. The other extremity of the inner tube 192 has a cable 196 connected thereto which is wound partially around the sheave 160 and anchored to the same at an anchoring connection 198. Thus, it will be seen that when the inner tube 198 with the cable 196 attached thereto is moved relative to the outer tube 182, or out of the same, the cable attached to the sheave 160 will cause rotation of the same, rotating the arms 165 and 168 in a clockwise direction. The inner tube is caused to be raised to move out of the confines of the outer tube 182 by engaging the hook member 195 to the rod-like connection 75 between the pivot arms or links 70 and the roof. To accomplish such engagement, the tube assembly or latch will be rotated on its pivotal mounting or bracket 184 by pulling on the rope or cable 190. A small bias spring 200 is connected between the outer tube 182, as at 201, and the mounting bracket 175, as at 202, and applies a bias to the tube assembly pivoting the same on its mounting bracket away from proximity with the rod-like member 75. Thus, whenever it is desired to open the rear door 48 of the container, the cable or rope 190 will be pulled to pivot the tube assembly or latch means 180 with the hook extremity 195 into proximity with the rod member 75 forming the pivot supports for the links 70. This can be accomplished only when the roof is in the lowered position. When the hook extremity 195 or member is placed around the rod member 75 and the actuator or actuators 84 are energized to pivot the links 70 raising the roof to a raised position, the tube assembly or latch means 180 will be operated by causing the inner tube 192 to be withdrawn from the outer supporting tube 182. This will draw the cable 196 on the sheave 160 and rotate the same to rotate the arms 165 and 168 and pivot the door 48 on its pivotal support 50. Similarly, the door will remain in a raised position as long as the actuators 84 are energized to raise the roof and maintain it in a raised position. The door may be closed by subsequent operation of the actuator or actuators 84 to depress the roof to a point where the hook extremity 195 will move free from the rod-like member 75 under the influence of its bias spring 200 to release the latch and the spring 175 will cause the arms 165 and 168 to rotate in a counter clockwise direction pivoting the rear door 48 to a closed position, wherein it will be held closed by the force of the spring 175 applied against the arms 165, 168.

Thus, in this embodiment, the loading and compacting of the container will be affected in the same manner as in the previous embodiment with periodic compaction affected by operation or energization of the actuators 80 and 84, to pivot the roof between raised and compacting positioned. Whenever a stack is completely formed and it is desired to discharge the same the latch mechanism 180 will be operated with the roof in the lowered position to engage the hook member or extremity 195 with the rod member 75 of the links 70 and to be held there until the actuators 80 and 84 are energized to raise the roof clearing the roof from the compacted stack. As the roof is raised, the rear door will be open and thereafter the fork-like unloader will be operated through energization of its actuators to discharge the stack and tilt the floor of the container allowing discharge of the stack on the ground.

In considering this disclosure it is noted that the disclosure is intended to be illustrative only and the scope of the invention should be determined by the appended claims.

What we claim is:
1. A stack forming apparatus comprising: a chassis having a pair of wheels intermediate the extent of the same and supporting the chassis with a hitch at one end thereof; a crop receiving container positioned on said chassis over said wheels and extending from the other end thereof intermediate the extent of the chassis, said crop receiving container having upstanding sides and an open upper front side for the introduction of loose crop therethrough; a pick up means positioned by said chassis forward of said container and having a discharge chute extending adjacent to the open front side of the container; a movable roof for said container having downwardly projecting rear and side portions integral therewith and an open front extremity; a pivoted rear door for said container pivoted at the rear upper edge of the upstanding sides of the container and adapted to pivot from the top edge of the container; means including a first actuator means connected to the upstanding sides of the container adjacent the rear end thereof for pivoting rear of roof, and a second pair of actuator means connected to the top of the roof adjacent the forward edge of the same and to the sides of the container intermediate the extent thereof with said actuators pivoting the roof at the front and back through different arcs, said container having a floor pivoted intermediate the extent of the same and adjacent the axis of said wheels, and a push type unloader connected to the front wall of the container and adapted to push a stack within the container along the floor thereof causing pivoting of the floor as the stack is discharged.

2. The stack forming apparatus of claim 1 in which the means including the first actuator means includes a pair of pivoted linkage members connected to the top of the container at the rear edge thereof and to the rear edge of the roof with one extremity of the first actuator means connected to the linkage members intermediate the extent thereof for pivoting the rear of the roof through a predetermined arc.

3. The stack forming apparatus of claim 2 in which the first actuator means is a pair of actuators pivotally connected respectively to the linkage members and being located on either side of the container.

4. The stack forming apparatus of claim 2 in which the linkage members pivotally mounting the rear edge of the roof and the actuators mounting the front edge of the roof in the extended and raised position locate the sides and rear of the roof adjacent the upstanding sides of the container to prevent leakage of crop from the discharge chute being blown into the container.

5. The stack forming apparatus of claim 1 in which the rear side of the roof is of a shorter dimension than the sides which are tapered to provide a complete enclosure with the roof in the elevated position and for the different arcs of movement of the front and rear edge of the roof.

6. The stacking forming apparatus of claim 1 in which the first actuator means and the second pair of actuator means are connected together for simultaneous operation.

7. The stack forming apparatus of claim 2 in which the linkage members connected to the pivoted rear door includes a pair of links connected at their extremities of the door and to the upstanding sides of the container with the opposite extremities being pivotally connected together and with a rod member attached to the pivoted extremities and to the floor to move the linkage members and open the door as the floor is pivoted in the container.

8. The stack forming apparatus of claim 7 and including latch means positioned at the bottom of the pivoted rear door and the rear edge of the floor to hold the door closed in the raised position of the floor.

9. The stack forming apparatus of claim 8 in which the latch means includes teeth members positioned in the lower edge of the door and receiving apertures positioned in the floor to hold the lower edge of the door to the floor in the closed position.

10. The stack forming apparatus of claim 1 in which the push type unloader connected to the front wall of the container includes a pivoted lever system connected at one extremity to the front of the container and to the other extremity to a fork type push members positioned across the width of the container and including an actuator means connected to the pivoted levers to move the fork type push member along the floor to a position beyond the pivoted center of the floor for the purpose of tilting the same to discharge a stack from the container.

11. The stack forming apparatus of claim 1 and including linkage members having a selectively operable latch means coupling the pivoted rear door of the container to the rear of the roof to open the door with operation of the first actuator means.

12. The stack forming apparatus of claim 11 in which the linkage members include a rotary drum mounted on the side of the container and mounting an arm coupled to the pivoted rear door to pivot the same with means coupled to the roof by the latch means to rotate the drum.

13. The stack forming apparatus of claim 12 in which the latch means is a pivoted tube with an inner slidable tube positioned therein having a hook member at one extremity and a cable at the other extremity with the cable being wound around the drum to rotate the drum.

14. The stack forming apparatus of claim 11 and including spring bias members connected in part to the side of the container and in part to the linkage means to bias the rear door to a closed position and the latch means to a retracted unlatched position.

15. The stack forming apparatus of claim 13 and including a pair of springs mounted at one extremity on the container and connected respectively to the arm coupled to the rear door and to the pivoted tube to bias the door to the closed position and the hook member away from the roof.

* * * * *

UNITED STATES PATENT OFFICE
CERTIFICATE OF CORRECTION

PATENT NO. : 3,965,660
DATED : June 29, 1976
INVENTOR(S) : Glenn G. Kanengieter and Gerald E. Barry It is certified that error appears in the above—identified patent and that said Letters Patent are hereby corrected as shown below:

Column 10, line 8, delete "means" and insert - members -

Signed and Sealed this

Seventh Day of September 1976

[SEAL]

Attest:

RUTH C. MASON
*Attesting Officer*

C. MARSHALL DANN
*Commissioner of Patents and Trademarks*